United States Patent
Nytoft

(10) Patent No.: US 12,540,598 B2
(45) Date of Patent: Feb. 3, 2026

(54) METHOD FOR MANUFACTURING A SHARP-EDGED COMPOSITE PART FOR A WIND TURBINE BLADE

(71) Applicant: LM WIND POWER A/S, Kolding (DK)

(72) Inventor: Thomas Nytoft, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/697,823

(22) PCT Filed: Nov. 9, 2022

(86) PCT No.: PCT/EP2022/081334
§ 371 (c)(1),
(2) Date: Apr. 2, 2024

(87) PCT Pub. No.: WO2023/083892
PCT Pub. Date: May 19, 2023

(65) Prior Publication Data
US 2025/0237190 A1    Jul. 24, 2025

(30) Foreign Application Priority Data
Nov. 10, 2021 (EP) .................... 21207514

(51) Int. Cl.
*F03D 1/06* (2006.01)
*B29D 99/00* (2010.01)

(52) U.S. Cl.
CPC ....... *F03D 1/0682* (2023.08); *B29D 99/0028* (2013.01); *F05B 2230/23* (2013.01); *F05B 2280/6003* (2013.01)

(58) Field of Classification Search
CPC .... F03D 1/0675; F03D 1/0679; F03D 1/0681; F03D 1/0682; F05B 2230/23;
(Continued)

(56) References Cited

FOREIGN PATENT DOCUMENTS

DE    102011082664 A1    3/2013
DE    102012223707 A1 *  6/2014    ........... B29C 33/306
(Continued)

OTHER PUBLICATIONS

DE-102012223707-A1, English Translation of Description (Year: 2014).*

*Primary Examiner* — Brian P Wolcott
(74) *Attorney, Agent, or Firm* — Nath, Goldberg & Meyer; Jerald L. Meyer

(57) ABSTRACT

A method of manufacturing a composite part (70) for a wind turbine blade (10), the method comprising the steps of providing a mould (50) comprising a mould depression (51) with a floor surface (53) and an adjacent receiving section (54), and a mould inlay (60) having an insertion section (61) and a first side (63); arranging the insertion section (61) in the receiving section (54) of the mould depression (51) so that a junction of the first side (63) and the floor surface (53) forms a first mould edge (66); arranging a fibre material (74) on a moulding surface (52) adjacent to the junction and the first side (63); infusing the fibre material (74) with a resin (75) and curing the infused fibre material (74) to manufacture the composite part (70) having a first part edge (73) being formed by the junction, wherein the material of the first side (63) is chemically inert with the resin (75).

19 Claims, 6 Drawing Sheets

(58) Field of Classification Search
CPC ....... F05B 2280/6003; F05B 2280/702; B29D 99/0028
See application file for complete search history.

(56) References Cited

FOREIGN PATENT DOCUMENTS

| | | | |
|---|---|---|---|
| EP | 2634417 | A2 | 9/2013 |
| EP | 3482918 | A1 | 5/2019 |
| WO | 2014096002 | A2 | 6/2014 |

* cited by examiner

METHOD FOR MANUFACTURING A SHARP-EDGED COMPOSITE PART FOR A WIND TURBINE BLADE

This is a National Phase Application filed under 35 U.S.C. 371 as a national stage of PCT/EP2022/081334, filed Nov. 9, 2022, an application claiming the benefit of European Application No. 21207514.7, filed Nov. 10, 2021, the content of each of which is hereby incorporated by reference in its entirety.

TECHNICAL FIELD

The present disclosure relates to a method for manufacturing a composite part for a wind turbine blade in particular a flare composite part for reinforcing a section of a spar cap at to the pin joint of a segmented pin jointed wind turbine blade. The present disclosure also relates to a composite part as well as a wind turbine blade obtained by such a method.

BACKGROUND

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades become more challenging and costly. To address this, the industry is developing segmented wind turbine rotor blades (these may also be known as sectional or pin-joined wind turbine blades) wherein two or more separate blade segments are manufactured and then transported disassembled to a site for assembly into a complete blade. This may result in an easier manufacturing process and may reduce the cost of transportation and erection of wind turbines.

However, such discontinuations may introduce stress concentrations at the pin joint and especially in the end of the main blade segment at the pin joint. In order to mitigate this, additional composite parts reinforcing the spar caps in this region is typically arranged for.

A further trend is increasingly moulding composite parts of the blade in offline moulds, i.e. in dedicated moulds. For example, the spar caps can be moulded in this way and are then laid into the blade mould in this pre-cured configuration.

The combination of offline moulding of load bearing composite parts and segmented wind turbine blades thus involves configuring a joint between sides of the pre-cured spar cap and corresponding sides of the pre-cured composite parts so that the composite parts provide sufficient strength to the spar caps.

SUMMARY

On this background, it may be seen as an object of the present disclosure to provide a method of manufacturing a composite part for a wind turbine blade that results in a composite part which allows joining with a spar cap of the wind turbine blade without having to alter the geometry of the spar cap itself. Another object of the present disclosure is to provide a wind turbine blade comprising such a composite part.

One or more of these objects may be met by aspects of the present disclosure as described in the following.

A first aspect of this disclosure relates to a method of manufacturing a composite part for being joined to a spar cap of a wind turbine blade, the method comprising the steps of:
providing:
a mould comprising a mould depression with a floor surface and an adjacent receiving section, and
a mould inlay having an insertion section and a first side;
arranging the insertion section of the mould inlay in the receiving section of the mould depression so that a junction of the first side of the mould inlay and the floor surface of the mould depression forms a first mould edge and so that a moulding surface is formed at least by the floor surface of the mould depression and the first side of the mould inlay;
arranging a fibre material on the moulding surface adjacent to the junction and the first side of the mould inlay;
infusing the fibre material with a resin and curing the infused fibre material to manufacture the composite part having a first part edge being formed by the junction of the first side of the mould inlay and the floor surface of the mould depression, wherein the material of the first side of the mould inlay is chemically inert with the resin; and
demoulding the composite part from the mould depression.

The method preferably comprises the step of mating a first side of the composite part including the first part edge to a first side of the spar cap of a wind turbine blade shell part so as to reinforce an end section of the spar cap.

By including a mould inlay in the mould during moulding, the moulded composite part may match the desired geometry even better. In particular, the first part edge can be made sharp, i.e., with a relatively small or negligible edge rounding, so that the interface between the first side of the composite part matches the corresponding side of the spar cap. This may ensure that a strong and durable connection between the composite part and the spar cap can be formed and may reduce or even avoid surface discontinuations in the transition between the composite part and the spar cap. Furthermore, the mould inlay allows demoulding a complex shaped composite part with reduced or even negligible mould wear. The mould inlays can be reused for subsequent moulding cycles and simply replaced when worn out. Thus, the lifetime of the mould is improved.

In the context of the present disclosure, the chemical inertness (or chemical non-reactiveness) of the material of the mould inlay is interpreted to mean that the resin does not bond to the material of the mould inlay and thus the mould inlay is prevented from being adhered to the composite part during curing of the resin. The resin may be epoxy, vinyl ester, polyester, or a thermoplastic resin, such as Elium®. Accordingly, the material of the mould inlay may be chemical inert with these resin types. A thermoplastic resin may be advantageous since it may increase recyclability of the composite part.

Additionally, the fibre material may comprise a plurality of fibre plies. The plies may be unidirectional or multiaxial, such as biaxial or triaxial, or a combination thereof. The fibre plies may comprise glass fibres or preferably carbon fibres or a combination thereof. The fibre plies may comprise dry fibres or pre-impregnated fibres. Additionally or alternatively, the fibre material may comprise a plurality of pultrusions.

The method of the present disclosure may be applicable to moulding composite parts other than a wind turbine blade part.

Additionally, the first mould edge may be substantially sharp. Correspondingly, the first part edge of the composite part formed by the junction may be substantially sharp.

In the context of the present disclosure, a "substantially sharp edge" is interpreted to mean that the maximum rounding radius or chamfer of this edge is significantly smaller, such as at least an order of magnitude smaller, preferably two orders of magnitude smaller, than the rounding radius or chamfer of a different edge of the mould depression. For example, the mould depression may comprise a rounded edge opposite of the junction. A rounding radius or chamfer of the substantially sharp edge may be at least an order of magnitude, preferably two orders of magnitude, smaller than a rounding radius or chamfer of said rounded edge opposite of the junction. In some embodiments, the "substantially sharp edge" may be an edge having a maximum rounding radius of 1 mm.

In the context of the present disclosure, the term "longitudinal" is interpreted to mean "extending in a longitudinal direction" of the respective one of the mould depression or the composite part. The longitudinal direction extends along the direction of greatest extent of the respective part.

Preferably, the composite part may be a longitudinal composite part, such as a composite plank or beam. Accordingly, the mould depression and thus the floor surface and the receiving section of the mould depression may be longitudinal. The mould inlay and thus the insertion section and first side of the mould inlay may be longitudinal. The substantially sharp edge of the junction may be longitudinal, and the substantially sharp edge of the composite part may be longitudinal.

Additionally or alternatively, the material of the first side of the mould inlay may be a polymer material, preferably silicone. The polymer material may have a tensile strength in the range of 3-6 N/mm$^2$, preferably 4-5 N/mm$^2$, more preferably about 4.5 N/mm$^2$. The polymer material may have a Shore A hardness in the range of 10-40, preferably 20-30, more preferably 23-27.

It has been found that a polymer material such as silicone may be particularly advantageous as silicone has an advantageous stiffness which allows minimal deformation during infusion and curing of the composite part while allowing easy demoulding as the mould inlay of the polymer material, such as silicone, can deform slightly when demoulding to allow an operator to remove the mould inlay and composite part with reduced or minimal wear on the mould.

Additionally, the mould inlay may be formed in one piece of the polymer material, preferably silicone.

Such a mould inlay may be particularly simple to manufacture.

Additionally or alternatively, the receiving section of the mould depression may comprise a longitudinal groove, and the insertion section of the mould inlay may comprise a corresponding protrusion preferably matching the shape of the longitudinal groove, wherein the step of arranging the mould inlay in the receiving section of the mould depression may comprise arranging the protrusion in the groove preferably so as to retain the mould inlay in the mould.

Additionally, the protrusion may be dimensioned so that the protrusion is compressed when arranged in the groove so as to frictionally retain the mould inlay in the receiving section of the mould depression.

Additionally or alternatively, the moulding surface may extend along a curved and/or twisted course in the longitudinal direction.

Additionally or alternatively, an intermediate draft angle of the first side of the composite part may be negative and the step of demoulding the composite part may comprise demoulding the composite part together with the mould inlay from the mould depression. Hence, the composite part and the mould inlay may be demoulded together as a single piece and subsequently separated.

Additionally or alternatively, an angle between the first side of the mould inlay and the floor surface may be acute, i.e. less than 90 degrees.

Additionally or alternatively, the mould inlay may comprise a plurality of mould inlay segments arranged end-to-end in series in the receiving section of the mould.

Additionally or alternatively, the mould may be formed in one piece.

Additionally or alternatively, the mould depression comprises a parting line for demoulding the composite part together with the mould inlay, and wherein the first lateral side and the second lateral side forms a positive draft angle with respect to the parting line.

Additionally or alternatively, a second side of the mould inlay, which is opposite of the first side, may be arranged adjacent to, preferably in contact with, a first lateral side of the receiving section. The first lateral side may form a positive first draft angle with the floor surface of the mould depression. The mould depression may comprise a second lateral side which may be opposite of the first lateral side and may form a positive second draft angle with the floor surface.

Additionally or alternatively, the step of demoulding the composite part may comprise removing the composite part and the mould inlay from the mould depression and separating the composite part from the mould inlay.

Additionally or alternatively, the step of infusing the fibre material with a resin and curing the infused fibre material may comprise the steps of:
  preferably arranging a vacuum foil over the fibre material so as to create a mould cavity bounded by the moulding surface and the vacuum foil;
  preferably evacuating the mould cavity via a vacuum source;
  preferably infusing the fibre material in the mould cavity with a resin;
  preferably causing or letting the resin cure to manufacture the composite part; and
  preferably debagging the composite part by removing the vacuum foil.

Additionally or alternatively, the method may further comprise cutting the composite part to provide a second side tapering along the longitudinal direction. The second side may be opposite of a first side of the composite part. However, in some embodiments, the step of cutting the composite part may be omitted. The method may further comprise mating and preferably bonding a first side of the composite part including the first part edge to a first side of a spar cap of a wind turbine blade shell part preferably so as to reinforce an end section of the spar cap and/or so that a first surface of the composite part including the first part edge and a first surface of the spar cap forms a substantially continuous surface. The first surface of the composite part and the spar cap may be configured for being oriented towards the exterior of the wind turbine blade. The spar cap is preferably cured previously to forming the joint with the composite part, for example in a different offline mould, i.e. a dedicated spar cap mould.

Additionally, the composite part may be a first composite part, and the method may further comprise the steps of providing a second composite part by a method according to the first aspect of this disclosure. The second composite part is then preferably cut to provide a second side tapering along the longitudinal direction. The second side may be opposite of a first side of the second composite part. However, in some embodiments, the step of cutting the second composite part may be omitted. The method may further comprise mating and bonding the first side of the second composite part to a second side of the spar cap so as to reinforce the end section of the spar cap and preferably so that the end section of the spar cap flares towards an end of the spar cap.

In the context of this disclosure, the flaring of the end section of the spar cap may be understood as the composite parts form a tapering of the end section of the spar cap so that the width of the composite parts and the spar cap increases towards the corresponding end of the spar cap.

A second aspect of this disclosure relates to a composite part for a wind turbine blade shell part obtainable by a method according to the first aspect of this disclosure.

A third aspect of this disclosure relates to a wind turbine blade shell part comprising a first composite part and a second composite part and a spar cap. The composite parts may preferably be obtained by the method according to the first aspect of this disclosure. A first side of the first composite part may include a first part edge and may be adhered to a first side of the spar cap. A first side of the second composite part may include a first part edge and may be adhered to a second side of the spar cap. The second side of the spar cap may be opposite of the first side of the spar cap preferably so that the first and second composite parts and the spar cap flares towards an end of the spar cap.

A fourth aspect of this disclosure relates to a method of manufacturing a blade shell part, the method comprising the steps of: manufacturing and providing a spar cap, the spar cap having a first side and a second side; manufacturing a first composite part according to the method of any of the aforementioned methods; and arranging the first composite part such that the first side of the first composite part is mated to the first side of the spar cap.

The method according to the fourth aspect may additionally comprise manufacturing a second composite part according to any of the aforementioned methods; and arranging the second composite part such that the first side of the second composite part is mated to the second side of the spar cap.

A person skilled in the art will appreciate that any one or more of the above aspects of this disclosure and embodiments thereof may be combined with any one or more of the other aspects of this disclosure and embodiments thereof.

In the described embodiments, the first side and second side of the spar cap are preferably lateral sides, i.e. sides that extend substantially in the spanwise direction of the blade shell (or wind turbine blade). In other words, these sides face towards the leading edge and trailing edge of the wind turbine blade, respectively. Similarly, the first side of the composite part, which is configured to mate to the first side or second side of the spar cap, is also a lateral side. Preferably, both the spar cap and composite part comprise a surface that faces towards the exterior of the blade shell and lateral sides that face towards the leading edge or trailing edge of the wind turbine blade.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

In the following figure description, the same reference numbers refer to the same elements and may thus not be described in relation to all figures.

Figure 1:
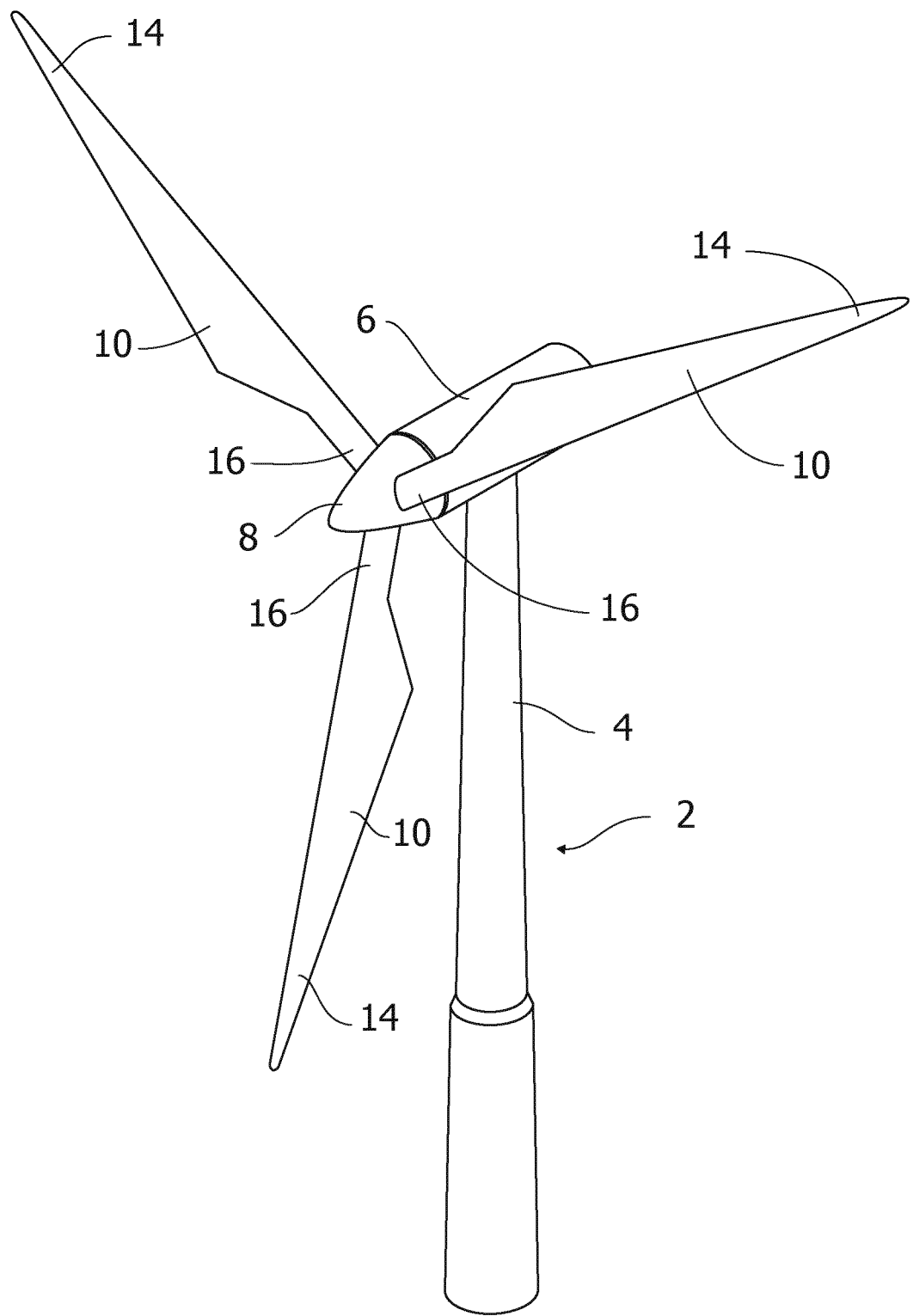
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
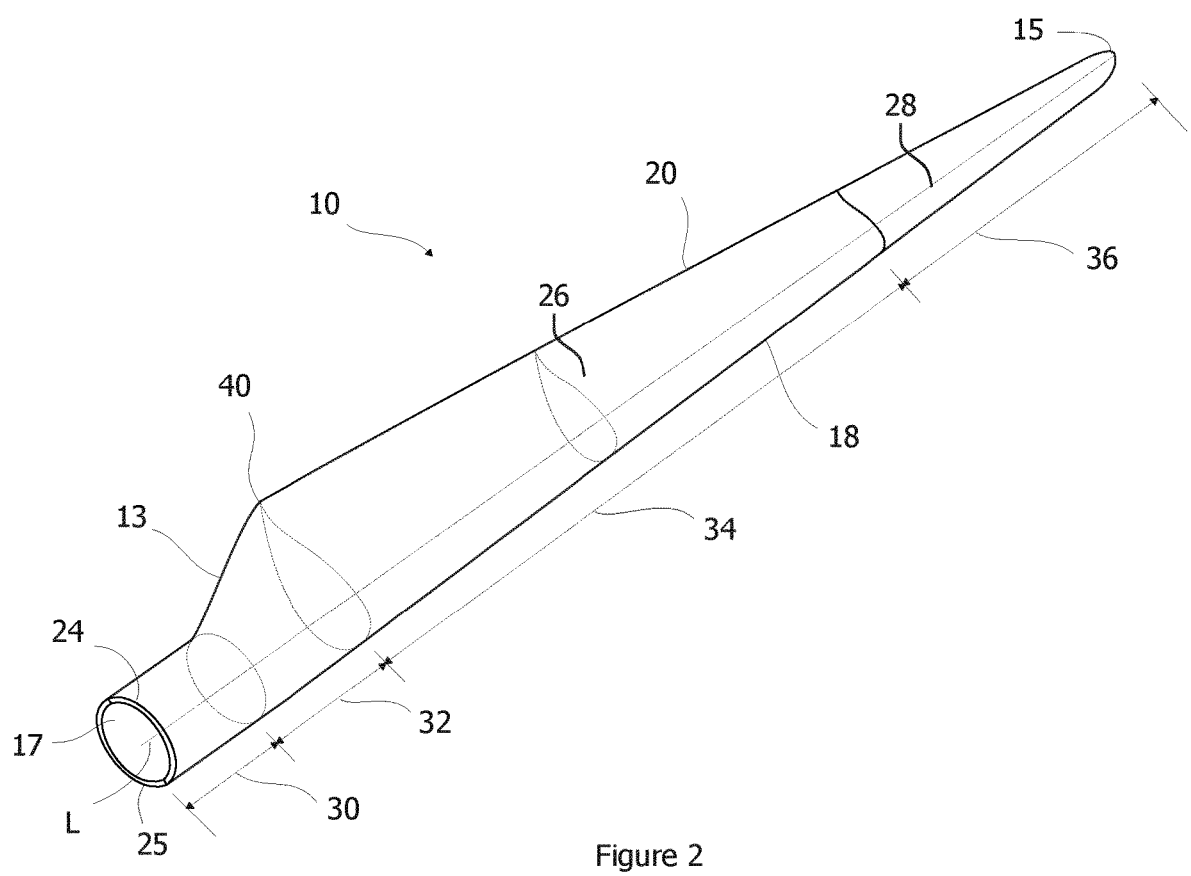
FIG. 2 is a schematic perspective view of a segmented wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub 8.

A shoulder 40 of the blade 10 is defined as the position where the blade 10 has its largest chord length. The shoulder 40 is typically provided at the boundary between the transition region 32 and the airfoil region 34. The outermost third of the airfoil region 34 is typically referred to as the tip region 36. FIG. 2 also illustrates the longitudinal direction L defining longitudinal extent of the blade.

The shown blade 10 is a segmented blade divided into a root segment 26 and a tip segment 28 connected at a chordwise joint. Both blade segments are formed of a first side shell part 24 and a second shell part 25 bonded together along a bond line typically extending along the leading edge 18 and the trailing edge 20.

Internally, the blade 10 comprises spar caps typically integrated in the shells 24, 25 connected via one or more shear webs.

Figure 3A:
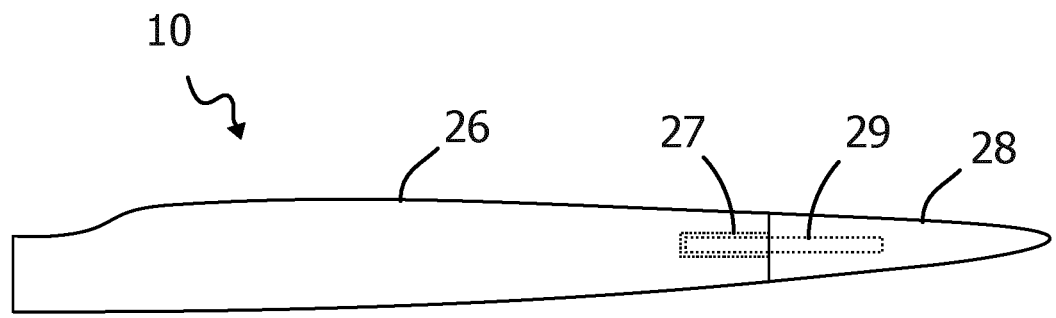
FIG. 3a is a schematic side view of the segmented wind turbine blade.

FIG. 3a schematically illustrates the segmented wind turbine blade 10 of FIG. 2. It is made up at least of a root segment 26 and a tip segment 28 divided at a chordwise joint. To allow joining of the root segment 26 with the tip segment 28, the two segments 26, 28 comprises a female receiving section 27 and a mating male spar beam 29 inserted into and engaging with the female receiving section 27. The female receiving section 27 and the male spar beam 29 may be fixed together via a locking arrangement at the chordwise joint with a pin.

Figure 3B:
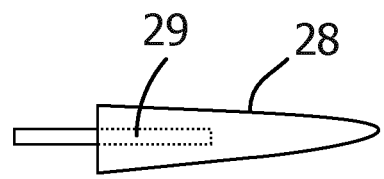
FIG. 3b is a schematic view of a tip segment of the segmented wind turbine blade.

FIG. 3b illustrates the tip segment 28 of the segmented blade 10 shown in the previous figures. Aside from the shell that forms the aerodynamic profile of the blade 10, the tip segment 28 further comprises the male spar beam 29 as described above. The male spar beam 29 of the tip segment 28 protrudes beyond (outside) the tip segment shell at the chordwise joint to allow the male spar beam 29 to engage with the corresponding female receiving section 27 arranged in the root segment 26.

Figure 3C:
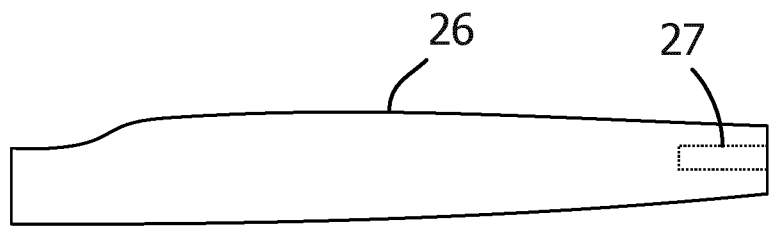
FIG. 3c is a schematic view of a root segment of the segmented wind turbine blade.

FIG. 3c illustrates the root segment 26 of the segmented blade 10. As described above, the root segment 26 comprises a female receiving section 27 for receiving the male spar beam 29 of the tip segment 28 in order to allow the root segment 26 and the tip segment 28 to be securely joined together. The final blade is obtained by mating the male spar beam 29 with the female receiving section 27, securing the two together at the chordwise joint, sealing the region where the blade segments 26, 28 meet, and providing any finishing touches to the blade.

In order to ensure sufficient strength of the root segment 26 which receives the load from the tip segment 28, composite parts are added to the spar cap of the root segment 26. Such composite parts are manufactured in the following way.

Figure 4A:
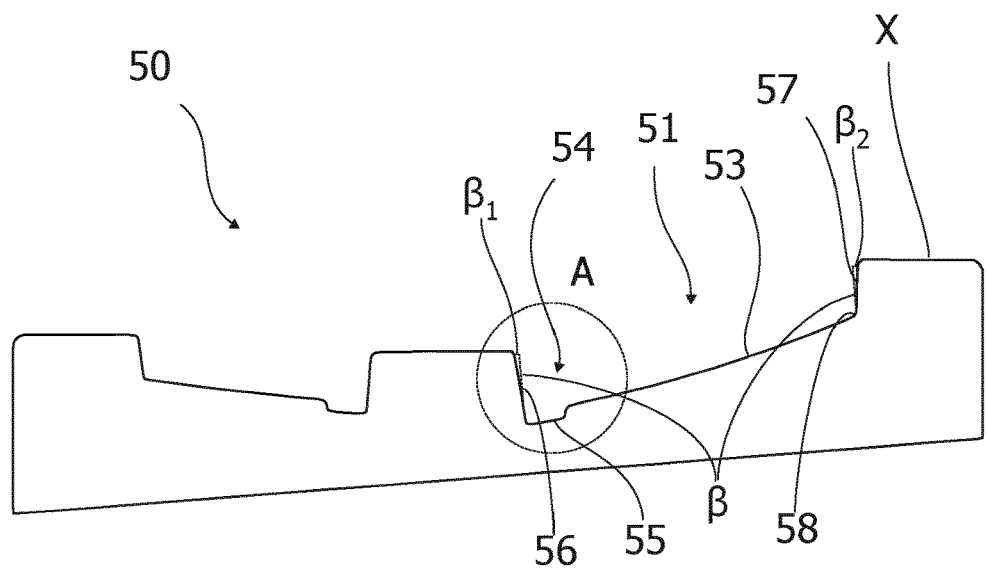
FIG. 4a is a schematic cross-sectional view of a mould for moulding a composite part.

Turning to FIG. 4a, a mould 50 for moulding the composite part is provided. The mould 50 is formed in one piece and comprises a mould depression 51 extending along a longitudinal direction (through the plane of FIG. 4a and indicated on FIG. 4b). The mould depression 51 comprises a floor surface 53 and an adjacent receiving section 54. The receiving section 54 and the floor surface 53 are bounded by a first lateral side 56 near the receiving section 54 and a second lateral side 57 opposite the receiving section 54. The first lateral side 56 and the second lateral side 57 are arranged with a positive first draft angle $\beta_1$ and a positive section draft angle $\beta_2$, respectively. The receiving section 54 comprises a longitudinally extending groove 55. A second moulding edge 58 is defined by the junction of the floor surface 53 and the second lateral side 58. The second moulding edge 58 is rounded.

Figure 4B:
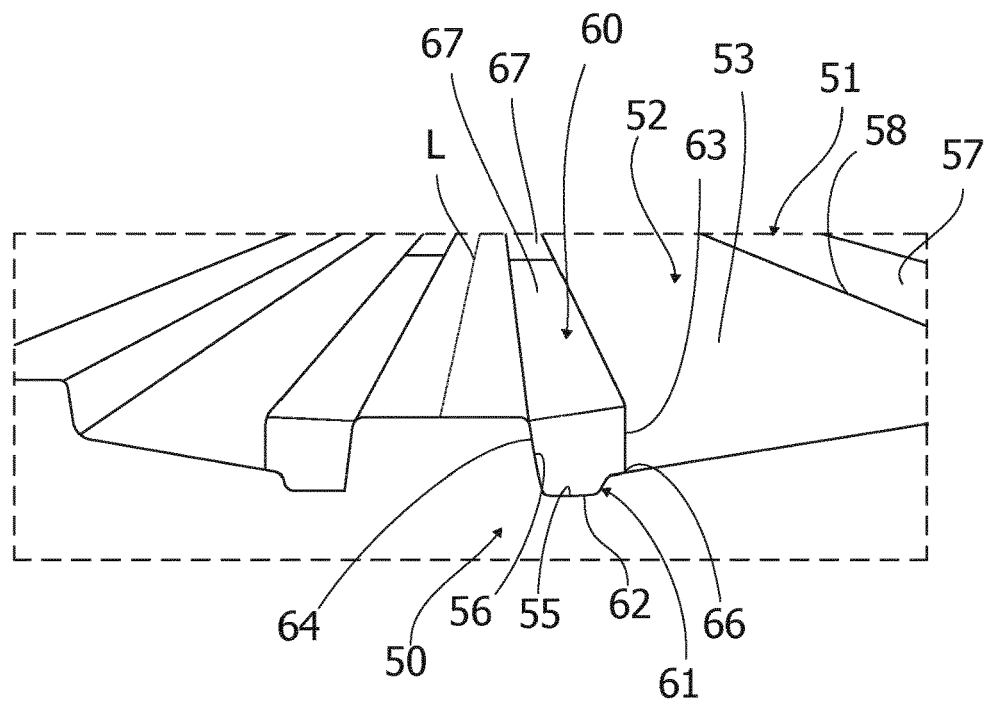
FIG. 4b is a schematic perspective view of the mould with a mould inlay.

Turning to FIG. 4b, a mould inlay 60 is arranged in the mould 50. The mould inlay 60 comprises a first side 63 oriented towards the interior of the mould depression 51 and a second side 64 placed in contact with the first lateral side 56 of the mould depression 51. The mould inlay 60 including the first side 63 is formed in one single piece of silicone. The mould inlay 60 further comprises an insertion section 61 with a longitudinal protrusion 62 arranged in and matching the shape of the longitudinal groove 55 of the receiving section 54 of the mould depression 51. The protrusion 62 may be dimensioned so that the protrusion is compressed when arranged in the groove 55 and the mould inlay 60 is accordingly frictionally retained in the receiving section 54 of the mould depression 51. The mould inlay 60 is arranged so that a junction of the first side 63 of the mould inlay 60 and the floor surface 53 of the mould depression 51 forms a first mould edge 66. This is also shown and described in further detail in connection with FIG. 5 below.

The first side 63 of the mould inlay 60, the floor surface 53 of the mould depression 51, and the second lateral side 57 of the mould depression 51 together form the moulding surface 52 of the mould 50. The moulding surface 52 may extend along a curved (for example, when the blade is pre-bent) and/or twisted (for example, when the blade is twisted) course in the longitudinal direction L.

Especially when moulding a composite part intended for very long blades, the mould inlay 60 may comprise a plurality of mould inlay segments 67 arranged end-to-end in series in the receiving section 54 of the mould 50.

Figure 5:
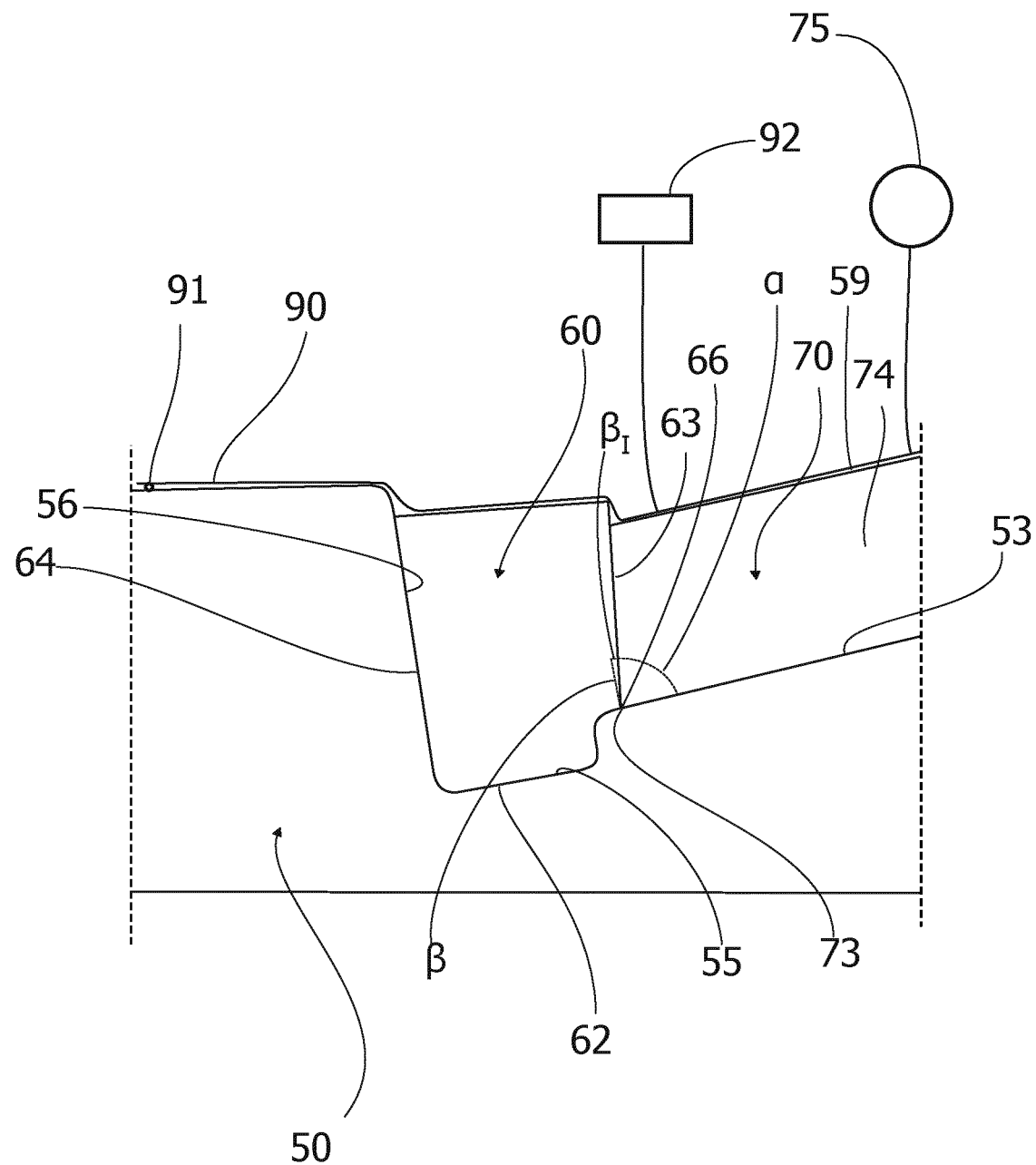
FIG. 5 is a schematic cross-sectional view of a mould layup in the mould with a mould inlay and fibre material covered by a vacuum foil.

Turning to FIG. 5, the moulding process is shown. The mould inlay 60 is first arranged in the receiving section 54 of the mould depression 51 as previously described in connection with FIG. 4b. A fibre material 74 is arranged on the moulding surface 52 adjacent to the junction and the first side 63 of the mould inlay 60. The fibre material 74 can for instance be a stack of fibre sheets, e.g. carbon and/or glass fibre sheets. The fibre material 74 is thus stacked up layer upon layer from the floor surface 53 and abutted up against the first side 63 of the mould inlay 60 up to a desired height preferably matching the height of the spar cap to be reinforced.

The fibre material 74 and the mould inlay is then covered by a vacuum foil 90 sealed by a seal 91 against the mould 50 to create a mould cavity 59 bounded by the moulding surface 52 and the vacuum foil 90. The mould cavity is evacuated via a vacuum source 92 sucking a resin 75, e.g. a polyester resin or epoxy resin, through the fibre material which is thereby infused with the resin 75. In FIG. 5, a resin inlet into the mould cavity 59 and the vacuum source 92 are schematically shown and will in practice be arranged on opposite sides of the fibre material 74. Depending on the resin type, the infused fibre material 74 is then caused to, e.g. by applying heat, or simply let, e.g. by letting time pass, cure to manufacture a cured composite part 70. An operator debags the composite part 70 and the mould inlay 60 by removing the vacuum foil 90 and any auxiliary layers, such as flow media layer.

The cured composite part 70 thus comprises a first side 71 formed by the first side 63 of the mould inlay 60. The first side 71 has a negative intermediate draft angle $\beta_I$ with respect to the parting line $\beta$. Thus, the composite part 70 is demoulded together with the mould inlay 60 from the mould depression 51 as single piece and subsequently separated. The material of the mould inlay 60 is chemically inert or chemically non-reactive with the resin 75 so that cured composite part 70 is not bonded to the mould inlay 60 and separation thereof can be easily performed by an operator demoulding the mould inlay 60 and the cured composite part 70.

The first side 71 of the composite part 70 comprises a first part edge 73 corresponding to the first mould edge 66. Both the first mould edge 66 and the corresponding first part edge 73 are substantially sharp. Accordingly, these edges 66, 73 have a maximum rounding radius or chamfer which is negligible or at least significantly smaller, such as at least an order of magnitude smaller, preferably two orders of magnitude smaller, than a rounding radius or chamfer of an any different edge of the mould depression 51. For example, the edges 66, 73 have a maximum rounding radius that is at least an order of magnitude smaller than the second mould edge 58 as shown in FIG. 4a and than the rounded edges of the longitudinal groove 55.

Figure 6:
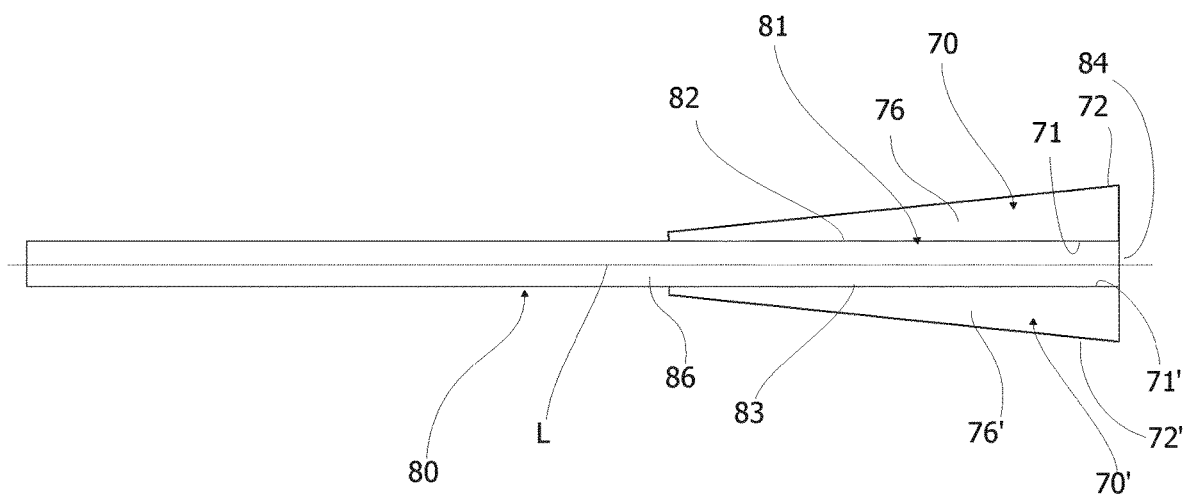
FIG. 6 is a schematic bottom view of a spar cap with composite parts adjacent to an end section of the spar cap.

Turning to FIG. 6, the composite part 70 is then prepared for being joined with a spar cap 80. The spar cap 80 has typically been cured previously, for example in a different offline mould, i.e., a dedicated spar cap mould. The composite part 70 is cut to provide a second side 72 tapering along the longitudinal direction L. In other embodiments, the composite part 70 may be moulded in this "cut" shape. The second side 72 is opposite of the first side 71 of the composite part 70 that includes the sharp first part edge 73. The composite part 70 is then placed adjacent to an end section 81 of the spar cap 80 so that the first side 71 of the composite part 70 mates with a first side 82 of the spar cap 80 so as to reinforce the end section 81 of the spar cap 80 and so that a bottom surface 76 of the composite part 70 including the first part edge 73 and a bottom surface 86 of the spar cap 80 forms a substantially continuous surface. The bottom surfaces 76, 86 are intended to be oriented towards the exterior of the wind turbine blade 10. A second composite part 70' is manufactured in substantially the same way. The second composite part 70' is a mirror image of the first composite part 70 in the longitudinal direction L. The suffixed prime symbol ' denotes the reference numerals of the second composite part 70' corresponding to those indicated for the first composite part 70. Thus, the composite parts 70, 70'. Once the composite parts 70, 70' are in place adjacent to the spar cap 80, the composite parts 70, 70' and the spar cap 80 can be infused and bonded together, e.g. by resin transfer infusion, to provide a reinforced spar cap 80 that forms a strengthened section of the load-bearing structure of the wind turbine blade. The first and second composite parts 70, 70' are placed adjacent to the spar cap 80 so that end section 81 of the reinforced spar cap 80 flares, i.e. tapers by becoming wider, towards the end 84 of the reinforced spar cap 80.

Exemplary Embodiments

Exemplary embodiments of the present disclosure are set out in the following items and articles:

Items

1. A method of manufacturing a composite part (70) for a wind turbine blade (10), the method comprising the steps of:
   providing:
   a mould (50) comprising a mould depression (51) with a floor surface (53) and an adjacent receiving section (54), and
   a mould inlay (60) having an insertion section (61) and a first side (63);
   arranging the insertion section (61) of the mould inlay (60) in the receiving section (54) of the mould depression (51) so that a junction of the first side (63) of the mould inlay (60) and the floor surface (53) of the mould depression (51) forms a first mould edge (66) and so that a moulding surface (52) is formed at least by the floor surface (53) of the mould depression (51) and the first side (63) of the mould inlay (60);
   arranging a fibre material (74) on the moulding surface (52) adjacent to the junction and the first side (63) of the mould inlay (60);
   infusing the fibre material (74) with a resin (75) and curing the infused fibre material (74) to manufacture the composite part (70) having a first part edge (73) being formed by the junction of the first side (63) of the mould inlay (60) and the floor surface (53) of the mould depression (51), wherein the material of the first side (63) of the mould inlay (60) is chemically inert with the resin (75); and
   demoulding the composite part (70) from the mould depression (51).

2. A method according to item 1, wherein the first mould edge (66) is substantially sharp, and wherein the first part edge (73) of the composite part (70) formed by the junction is correspondingly substantially sharp, preferably defined as having a maximum rounding radius of 1 mm.

3. A method according to any one of the previous items, wherein the material of the first side (63) of the mould inlay (60) is a polymer material, preferably silicone.

4. A method according to item 3, wherein the mould inlay (60) is formed in one piece of the polymer material, preferably silicone.

5. A method according to any one of the previous items, wherein the receiving section (54) of the mould depression (51) comprises a longitudinal groove (55) and the insertion section (61) of the mould inlay (60) comprises a corresponding protrusion (62) matching the shape of the longitudinal groove (55), wherein the step of arranging the mould inlay (60) in the receiving section (54) of the mould depression (51) comprises arranging the protrusion (62) in the groove (55) so as to retain the mould inlay (60) in the mould (50).

6. A method according to any one of the previous items, wherein the moulding surface (52) extends along a curved and/or twisted course in the longitudinal direction (L).

7. A method according to any one of the previous items, wherein an intermediate draft angle ($\beta_I$) of the first side (71) of the composite part (70) is negative and wherein the step of demoulding the composite part (70) comprises demoulding the composite part (70) together with the mould inlay (60) from the mould depression (51).

8. A method according to any one of the previous items, wherein the mould inlay (60) comprises a plurality of mould inlay segments (67) arranged end-to-end in series in the receiving section (54) of the mould (50).

9. A method according to any one of the previous items, wherein the mould (50) is formed in one piece.

10. A method according to any one of the previous items, wherein a second side (64) of the mould inlay (60), which is opposite of the first side (63), is arranged in contact with a first lateral side (56) of the receiving section (54), wherein the first lateral side (56) forms a positive first draft angle ($\beta_1$) with respect to a parting line (β) of the mould depression 51, and wherein the mould depression (51) comprises a second lateral side (57) being opposite of the first lateral side (56) and forming a positive second draft angle ($\beta_2$) with respect to a parting line (β) of the mould depression 51, wherein the step of demoulding the composite part (70) comprises:
removing the composite part (70) and the mould inlay (60) from the mould depression (51) along the parting line (β) and separating the composite part (70) from the mould inlay (60).

11. A method according to any one of the previous items, wherein the step of infusing the fibre material (74) with a resin (75) and curing the infused fibre material (74) comprises the steps of:
arranging a vacuum foil (90) over the fibre material (74) so as to create a mould cavity (59) bounded by the moulding surface (52) and the vacuum foil (90);
evacuating the mould cavity (59) via a vacuum source (92);
infusing the fibre material (74) in the mould cavity (59) with the resin (75);
causing or letting the resin (75) cure to manufacture the composite part (70); and
debagging the composite part (70) by removing the vacuum foil (90).

12. A method according to any one of the previous items further comprising:
cutting the composite part (70) to provide a second side (72) tapering along the longitudinal direction (L), the second side (72) being opposite of a first side (71) of the composite part (70); and
mating and bonding the first side (71) of the composite part (70) including the first part edge (73) to a first side (82) of a spar cap (80) at an end section (81) of the spar cap (80).

13. A method according to item 12, wherein the composite part (70) is a first composite part, and the method further comprises the steps of:
providing a second composite part (70') by a method according to any one of items 1-11;
cutting the second composite part (70') to provide a second side (72') tapering along the longitudinal direction (L), the second side (72') being opposite of a first side (71') of the second composite part (70'); and
mating and bonding the first side (71') of the second composite part (70') including the first part edge (73') to a second side (83) of the spar cap (80) at the end section (81) of the spar cap (80) and so that the end section (81) of the spar cap (80) flares towards an end (84) of the spar cap (80).

14. A composite part (70) for a wind turbine blade shell part ( ) obtainable by a method according to any one of items 1-13.

15. A wind turbine blade shell part comprising a first composite part (70) and a second composite part (70') and a spar cap, wherein a first side (71) of the first composite part (70) includes a first part edge (73) and is adhered to a first side (82) of the spar cap (80), and wherein a first side (71') of the second composite part (70') includes a first part edge (73') and is adhered to a second side (83) of the spar cap (80), the second side of the spar cap (80) being opposite of the first side (82) of the spar cap (80) so that the first and second composite parts (70, 70') and the spar cap (80) flares towards an end (84) of the spar cap (80).

Articles

1. A method of manufacturing a composite part (70) for reinforcing a spar cap of a wind turbine blade shell part, the method comprising the steps of:
providing:
a mould (50) comprising a mould depression (51) with a floor surface (53) and an adjacent receiving section (54), and
a mould inlay (60) having an insertion section (61) and a first side (63);
arranging the insertion section (61) of the mould inlay (60) in the receiving section (54) of the mould depression (51) so that a junction of the first side (63) of the mould inlay (60) and the floor surface (53) of the mould depression (51) forms a first mould edge (66) and so that a moulding surface (52) is formed at least by the floor surface (53) of the mould depression (51) and the first side (63) of the mould inlay (60);
arranging a fibre material (74) on the moulding surface (52) adjacent to the junction and the first side (63) of the mould inlay (60);
infusing the fibre material (74) with a resin (75) and curing the infused fibre material (74) to manufacture the composite part (70) having a first part edge (73) being formed by the junction of the first side (63) of the mould inlay (60) and the floor surface (53) of the mould depression (51), wherein the material of the first side (63) of the mould inlay (60) is chemically inert with the resin (75);
demoulding the composite part (70) from the mould depression (51); and
mating a first side of the composite part (70) including the first part edge (73) to a first side of the spar cap of the wind turbine blade shell part so as to reinforce an end section of the spar cap.

2. A method according to article 1, wherein the first mould edge (66) is substantially sharp, and wherein the first part edge (73) of the composite part (70) formed by the junction is correspondingly substantially sharp, preferably defined as having a maximum rounding radius of 1 mm.

3. A method according to any one of the previous articles, wherein the material of the first side (63) of the mould inlay (60) is a polymer material, preferably silicone.

4. A method according to article 3, wherein the mould inlay (60) is formed in one piece of the polymer material, preferably silicone.

5. A method according to any one of the previous articles, wherein the receiving section (54) of the mould depression (51) comprises a longitudinal groove (55) and the insertion section (61) of the mould inlay (60) comprises a corresponding protrusion (62) matching the shape of the longitudinal groove (55), wherein the step of arranging the mould inlay (60) in the receiving section (54) of the mould depression (51) comprises arranging the protrusion (62) in the groove (55) so as to retain the mould inlay (60) in the mould (50).

6. A method according to any one of the previous articles, wherein the moulding surface (52) extends along a curved and/or twisted course in the longitudinal direction (L).

7. A method according to any one of the previous articles, wherein an intermediate draft angle ($\beta_I$) of the first side (71) of the composite part (70) is negative and wherein the step of demoulding the composite part (70) comprises demoulding the composite part (70) together with the mould inlay (60) from the mould depression (51).
8. A method according to any one of the previous articles, wherein the mould inlay (60) comprises a plurality of mould inlay segments (67) arranged end-to-end in series in the receiving section (54) of the mould (50).
9. A method according to any one of the previous articles, wherein the mould (50) is formed in one piece.
10. A method according to any one of the previous articles, wherein a second side (64) of the mould inlay (60), which is opposite of the first side (63), is arranged in contact with a first lateral side (56) of the receiving section (54), wherein the first lateral side (56) forms a positive first draft angle ($\beta_1$) with respect to a parting line ($\beta$) of the mould depression 51, and wherein the mould depression (51) comprises a second lateral side (57) being opposite of the first lateral side (56) and forming a positive second draft angle ($\beta_2$) with respect to a parting line ($\beta$) of the mould depression 51, wherein the step of demoulding the composite part (70) comprises:
removing the composite part (70) and the mould inlay (60) from the mould depression (51) along the parting line ($\beta$) and separating the composite part (70) from the mould inlay (60).
11. A method according to any one of the previous articles, wherein the step of infusing the fibre material (74) with a resin (75) and curing the infused fibre material (74) comprises the steps of:
arranging a vacuum foil (90) over the fibre material (74) so as to create a mould cavity (59) bounded by the moulding surface (52) and the vacuum foil (90);
evacuating the mould cavity (59) via a vacuum source (92);
infusing the fibre material (74) in the mould cavity (59) with the resin (75);
causing or letting the resin (75) cure to manufacture the composite part (70); and
debagging the composite part (70) by removing the vacuum foil (90).
12. A method according to any one of the previous articles further comprising:
cutting the composite part (70) to provide a second side (72) tapering along the longitudinal direction (L), the second side (72) being opposite of a first side (71) of the composite part (70); and
mating and bonding the first side (71) of the composite part (70) including the first part edge (73) to a first side (82) of a spar cap (80) at an end section (81) of the spar cap (80).
13. A method according to article 12, wherein the composite part (70) is a first composite part, and the method further comprises the steps of:
providing a second composite part (70') by a method according to any one of articles 1-11;
cutting the second composite part (70') to provide a second side (72') tapering along the longitudinal direction (L), the second side (72') being opposite of a first side (71') of the second composite part (70'); and
mating and bonding the first side (71') of the second composite part (70') including the first part edge (73') to a second side (83) of the spar cap (80) at the end section (81) of the spar cap (80) and so that the end section (81) of the spar cap (80) flares towards an end (84) of the spar cap (80).

14. A method of manufacturing a composite part (70) for a wind turbine blade (10), the method comprising the steps of:
providing:
a mould (50) comprising a mould depression (51) with a floor surface (53) and an adjacent receiving section (54), and
a mould inlay (60) having an insertion section (61) and a first side (63);
arranging the insertion section (61) of the mould inlay (60) in the receiving section (54) of the mould depression (51) so that a junction of the first side (63) of the mould inlay (60) and the floor surface (53) of the mould depression (51) forms a first mould edge (66) and so that a moulding surface (52) is formed at least by the floor surface (53) of the mould depression (51) and the first side (63) of the mould inlay (60);
arranging a fibre material (74) on the moulding surface (52) adjacent to the junction and the first side (63) of the mould inlay (60);
infusing the fibre material (74) with a resin (75) and curing the infused fibre material (74) to manufacture the composite part (70) having a first side including a first part edge (73), the first part edge (73) being formed by the junction of the first side (63) of the mould inlay (60) and the floor surface (53) of the mould depression (51), wherein the material of the first side (63) of the mould inlay (60) is chemically inert with the resin (75), wherein the first side (71) is configured to be mated to a first side of a spar cap for the wind turbine blade; and
demoulding the composite part (70) from the mould depression (51).
15. A method according to article 14, wherein the method includes any of the steps recited in articles 2-13.
16. A method of manufacturing a blade shell part, the method comprising the steps of:
manufacturing and providing a spar cap, the spar cap (80) having a first side (82) and a second side (83);
manufacturing a first composite part (70) according to the method of any of articles 14-15; and
arranging the first composite part (70) such that the first side (71) of the first composite part (70) is mated to the first side (82) of the spar cap.
17. A method according to article 16, further comprising:
manufacturing a second composite part (70') according to the method of any of articles 14-15; and
arranging the second composite part (70') such that the first side (71') of the second composite part (70') is mated to the second side (82) of the spar cap.
18. A composite part (70) for a wind turbine blade shell part obtainable by a method according to any one of articles 1-15.
19. A wind turbine blade shell part comprising a first composite part (70) and a second composite part (70') and a spar cap, wherein a first side (71) of the first composite part (70) includes a first part edge (73) and is adhered to a first side (82) of the spar cap (80), and wherein a first side (71') of the second composite part (70') includes a first part edge (73') and is adhered to a second side (83) of the spar cap (80), the second side of the spar cap (80) being opposite of the first side (82) of the spar cap (80) so that the first and second composite parts (70, 70') and the spar cap (80) flares towards an end (84) of the spar cap (80).

| LIST OF REFERENCES | |
|---|---|
| 2 | wind turbine |
| 4 | tower |
| 6 | nacelle |
| 8 | hub |
| 10 | blade |
| 13 | shell |
| 14 | blade tip |
| 15 | tip end |
| 16 | blade root |
| 17 | root end |
| 18 | leading edge |
| 20 | trailing edge |
| 24 | first shell part |
| 25 | second shell part |
| 26 | root segment |
| 27 | female receiving section |
| 28 | tip segment |
| 29 | male spar beam |
| 30 | root region |
| 32 | transition region |
| 34 | airfoil region |
| 36 | tip region |
| 40 | shoulder |
| 50 | mould |
| 51 | mould depression |
| 52 | moulding surface |
| 53 | floor surface |
| 54 | receiving section |
| 55 | longitudinal groove |
| 56 | first lateral side |
| 57 | second lateral side |
| 58 | second mould edge |
| 59 | mould cavity |
| 60 | mould inlay |
| 61 | insertion section |
| 62 | protrusion |
| 63 | first side |
| 64 | second side |
| 66 | first mould edge |
| 67 | mould inlay segment |
| 70 | composite part |
| 71 | first side |
| 72 | second side |
| 73 | first part edge |
| 74 | fibre material |
| 75 | resin |
| 76 | bottom surface |
| 80 | spar cap |
| 81 | end section |
| 82 | first side |
| 83 | second side |
| 84 | end |
| 86 | bottom surface |
| 90 | vacuum foil |
| 91 | seal |
| 92 | vacuum source |
| α | angle |
| β | parting line |
| $β_1$ | first draft angle |
| $B_I$ | intermediate draft angle |
| $β_2$ | second draft angle |
| L | longitudinal direction |

The invention claimed is:

1. A method of manufacturing a composite part (70) for a wind turbine blade (10), the method comprising the steps of:
providing a mould (50) comprising a mould depression (51) with a floor surface (53) and an adjacent receiving section (54);
providing a mould inlay (60) having an insertion section (61) and a first side (63);
arranging the insertion section (61) of the mould inlay (60) in the receiving section (54) of the mould depression (51) so that a junction of the first side (63) of the mould inlay (60) and the floor surface (53) of the mould depression (51) forms a first mould edge (66) and so that a moulding surface (52) is formed at least by the floor surface (53) of the mould depression (51) and the first side (63) of the mould inlay (60);
arranging a fibre material (74) on the moulding surface (52) adjacent to the junction and the first side (63) of the mould inlay (60); and
infusing the fibre material (74) with a resin (75) and curing the infused fibre material (74) to manufacture the composite part (70) having a first part edge (73) being formed by the junction of the first side (63) of the mould inlay (60) and the floor surface (53) of the mould depression (51), wherein the material of the first side (63) of the mould inlay (60) is chemically inert with the resin (75), wherein the first side (71) is configured to be mated to a first side of a spar cap for the wind turbine blade,
wherein the receiving section (54) of the mould depression (51) comprises a longitudinal groove (55) and the insertion section (61) of the mould inlay (60) comprises a corresponding protrusion (62) matching the shape of the longitudinal groove (55), wherein the step of arranging the mould inlay (60) in the receiving section (54) of the mould depression (51) comprises arranging the protrusion (62) in the groove (55) so as to retain the mould inlay (60) in the mould (50).

2. A method of manufacturing a composite part (70) for a wind turbine blade (10), the method comprising the steps of:
providing a mould (50) comprising a mould depression (51) with a floor surface (53) and an adjacent receiving section (54);
providing a mould inlay (60) having an insertion section (61) and a first side (63);
arranging the insertion section (61) of the mould inlay (60) in the receiving section (54) of the mould depression (51) so that a junction of the first side (63) of the mould inlay (60) and the floor surface (53) of the mould depression (51) forms a first mould edge (66) and so that a moulding surface (52) is formed at least by the floor surface (53) of the mould depression (51) and the first side (63) of the mould inlay (60);
arranging a fibre material (74) on the moulding surface (52) adjacent to the junction and the first side (63) of the mould inlay (60);
infusing the fibre material (74) with a resin (75) and curing the infused fibre material (74) to manufacture the composite part (70) having a first side including a first part edge (73), the first part edge (73) being formed by the junction of the first side (63) of the mould inlay (60) and the floor surface (53) of the mould depression (51), wherein the material of the first side (63) of the mould inlay (60) is chemically inert with the resin (75), wherein the first side (71) is configured to be mated to a first side of a spar cap for the wind turbine blade so that a first surface of the composite part (70) including the first part edge (73) and a first surface of the spar cap form a substantially continuous surface; and
demoulding the composite part (70) from the mould depression (51).

3. The method according to claim 2, wherein the first mould edge (66) is substantially sharp, and wherein the first part edge (73) of the composite part (70) formed by the junction is correspondingly substantially sharp.

4. The method according to claim 2, wherein the moulding surface (52) extends along a curved and/or twisted course in the longitudinal direction (L).

5. The method according to claim 2, wherein an intermediate draft angle (βI) of the first side (71) of the composite part (70) is negative and wherein the step of demoulding the composite part (70) comprises demoulding the composite part (70) together with the mould inlay (60) from the mould depression (51).

6. The method according to claim 2, wherein the mould inlay (60) comprises a plurality of mould inlay segments (67) arranged end-to-end in series in the receiving section (54) of the mould (50).

7. The method according to claim 2, wherein the mould (50) is formed in one piece.

8. The method according to claim 2, wherein a second side (64) of the mould inlay (60), which is opposite of the first side (63), is arranged in contact with a first lateral side (56) of the receiving section (54), wherein the first lateral side (56) forms a positive first draft angle (1) with respect to a parting line ($\beta$) of the mould depression 51, and wherein the mould depression (51) comprises a second lateral side (57) being opposite of the first lateral side (56) and forming a positive second draft angle ($\beta_2$) with respect to a parting line ($\beta$) of the mould depression (51), wherein the step of demoulding the composite part (70) comprises:
removing the composite part (70) and the mould inlay (60) from the mould depression (51) along the parting line ($\beta$) and separating the composite part (70) from the mould inlay (60).

9. The method according to claim 2, wherein the step of infusing the fibre material (74) with a resin (75) and curing the infused fibre material (74) comprises the steps of:
arranging a vacuum foil (90) over the fibre material (74) so as to create a mould cavity (59) bounded by the moulding surface (52) and the vacuum foil (90);
evacuating the mould cavity (59) via a vacuum source (92);
infusing the fibre material (74) in the mould cavity (59) with the resin (75);
causing or letting the resin (75) cure to manufacture the composite part (70); and
debagging the composite part (70) by removing the vacuum foil (90).

10. The method according to claim 2, further comprising:
cutting the composite part (70) to provide a second side (72) tapering along the longitudinal direction (L), the second side (72) being opposite of a first side (71) of the composite part (70); and
mating and bonding the first side (71) of the composite part (70) including the first part edge (73) to a first side (82) of a spar cap (80) at an end section (81) of the spar cap (80).

11. The method according to claim 10, wherein the composite part (70) is a first composite part, and the method further comprises the steps of:
providing a second composite part (70') by a method according to claim 10;
cutting the second composite part (70') to provide a second side (72') tapering along the longitudinal direction (L), the second side (72') being opposite of a first side (71') of the second composite part (70'); and
mating and bonding the first side (71') of the second composite part (70') including the first part edge (73') to a second side (83) of the spar cap (80) at the end section (81) of the spar cap (80) and so that the end section (81) of the spar cap (80) flares towards an end (84) of the spar cap (80).

12. The method according to claim 2, further comprising mating a first side of the composite part (70) including the first part edge (73) to a first side of the spar cap so as to reinforce an end section of the spar cap.

13. A method of manufacturing a blade shell part, the method comprising the steps of:
manufacturing and providing a spar cap, the spar cap (80) having a first side (82) and a second side (83);
manufacturing a first composite part (70) according to the method of claim 2; and
arranging the first composite part (70) such that the first side (71) of the first composite part (70) is mated to the first side (82) of the spar cap.

14. The method according to claim 13, further comprising:
manufacturing a second composite part (70') according to claim 2; and
arranging the second composite part (70') such that the first side (71') of the second composite part (70') is mated to the second side (83) of the spar cap.

15. A composite part (70) for a wind turbine blade shell part manufactured by the method according to claim 2.

16. The method according to claim 2, wherein the first surface of the composite part and the first surface of the spar cap are configured for being oriented towards an exterior of the wind turbine blade.

17. A wind turbine blade shell part comprising a first composite part (70) and a second composite part (70') and a spar cap,
wherein a first side (71) of the first composite part (70) includes a first part edge (73) and is adhered to a first side (82) of the spar cap (80) so that a first surface (76) of the first composite part (70) including the first part edge (73) and a first surface (86) of the spar cap (80) form a substantially continuous surface, wherein the first surface (76) of the composite part (70) and the first surface (86) of the spar cap (80) are oriented towards the exterior of a wind turbine blade,
wherein a first side (71') of the second composite part (70') includes a first part edge (73') and is adhered to a second side (83) of the spar cap (80), the second side (83) of the spar cap (80) being opposite of the first side (82) of the spar cap (80) so that the first and second composite parts (70, 70') and the spar cap (80) flare towards an end (84) of the spar cap (80) so that an exterior surface (76) of the first composite part (70) including the first part edge (73), an exterior surface (76') of the second composite part (70') including the first part edge (73') and an exterior surface (86) of the spar cap (80) form a substantially continuous surface, wherein the first surface (76) of the first composite part (70), a first surface of the second composite part, and the first surface (86) of the spar cap (80) are oriented towards the exterior of the wind turbine blade.

18. The wind turbine blade shell part according to claim 17, wherein the first part edge (73) of the first composite part (70) is substantially sharp.

19. The wind turbine blade shell part according to claim 17, wherein the first part edge (73) of the first composite part (70) has a maximum rounding radius of 1 mm.

* * * * *